350-3.71 SR
1/6/81 OR 4,243,293

United States Patent [19] [11] 4,243,293
Kramer [45] Jan. 6, 1981

[54] HOLOGRAPHIC SCANNER INSENSITIVE TO MECHANICAL WOBBLE

[75] Inventor: Charles J. Kramer, Pittsford, N.Y.

[73] Assignee: Xerox Corporation, Stamford, Conn.

[21] Appl. No.: 921,409

[22] Filed: Jul. 3, 1978

[51] Int. Cl.³ .............................................. G02B 27/17
[52] U.S. Cl. .................................... 350/3.71; 350/6.2
[58] Field of Search ...................... 350/3.70, 3.71, 6.1, 350/6.2, 6.3, 320, DIG. 2

[56] References Cited

U.S. PATENT DOCUMENTS

| | | | |
|---|---|---|---|
| 3,614,193 | 10/1971 | Beiser | 350/3.71 X |
| 3,619,033 | 11/1971 | McMahon | 350/162 R |
| 3,795,768 | 3/1974 | Locke | 350/3.71 X |
| 3,922,059 | 11/1975 | Noguchi | 350/3.71 |
| 3,953,105 | 4/1976 | Ih | 350/3.71 |
| 4,094,576 | 6/1978 | Heiling | 350/3.71 |
| 4,113,343 | 9/1978 | Pole et al. | 350/3.71 |

OTHER PUBLICATIONS

Cindrich, "Image Scanning By Rotation Of A Hologram", *Applied Optics*, vol. 6, No. 9, Sep. 1967, pp. 1531-1534.

McMahon et al., "Light Beam Deflection Using Holographic Scanning Techniques", *Applied Optics*, vol. 8, No. 2, Feb. 1969, pp. 399-402.

Bartolini et al., "Embossed Hologram Motion Pictures . . . ", *Applied Optics*, vol. 9, No. 10, Oct. 1970, pp. 2283-2290.

Bryngdahl et al., "Laser Beam Scanning Using Computer-Generated Holograms", *Applied Optics*, vol. 15, No. 1, Jan. 1976, pp. 183-194.

*Primary Examiner*—John K. Corbin
*Assistant Examiner*—John D. Lee

[57] ABSTRACT

A holographic spinner reconstructs a light spot to rapidly scan a narrow line on a suitable "write" surface to generate an image. The geometry of the holographic spinner with respect to the holographic reconstruction light beam is such that the position of the regenerated light spot is insensitive to mechanical wobble which might be present in the spinner mechanism.

1 Claim, 3 Drawing Figures

30
C
C'
32
θ'd
θd
d
36
R
h
H
2
Φ
θi
6
4
D
R 30
32
34
6
R 30
32
C
C'
θ'd
θd
d
36
R
h
H
2
φ
θi
6
4
D
R

HOLOGRAPHIC SCANNER INSENSITIVE TO MECHANICAL WOBBLE

BACKGROUND OF THE INVENTION

This invention relates to light spot scanning, and more particularly to scanning with a spot of light generated holographically.

The primary function of a scanning system is the controlled sampling, or restoration, of information. In an optical scanning system, the information is processed either in parallel by a light beam which can simultaneously illuminate many data sites, or sequentially by a beam which, due to its size, illuminates only a single data site at a time. Interest in sequential optical scanning has expanded in recent years, primarily because of new capabilities provided by laser light. Laser scanners are capable of generating high resolution images at high scan rates. Most of the scanning systems devised to manipulate a laser beam include a galvanometer, rotating mirror, acousto-optic elements, or electro-optic elements as the light deflector. It was first demonstrated in 1967 that a rotating hologram can also serve as a deflector element in an image scanning system.

Laser line scanners used for imaging applications are generally required to generate a repetitive single scan line. A problem which has been encountered with multi-faceted rotating mirror line scanners is that due to the facet-to-facet nonuniformities and spinner wobble, noncollinear multiple scan lines are formed. An obvious solution to this problem is to fabricate the spinner assembly to such precise mechanical and optical tolerances that the residual error does not detract from the desired level of image quality. The expense of this approach, however, is a decided disadvantage. Holographic scanning provides an alternative by which this problem can be minimized.

In a typical arrangement for making a flat holographic spinner, a point light source serves as the object and a normally incident plane light wave as the reference beam. When a hologram thus constructed is illuminated with a plane light wave which is the conjugate of the original reference beam, the hologram functions to reconstruct a wavefront which converges with or without the use of additional optical elements to form an image of the original point object light source. When the holographic spinner is then rotated about the axis of the reference beam, the reconstructed image spot scans a circle in space. This spot, however, is subject to perturbations created by mechanical wobble of the spinner.

In co-pending application Ser. No. 708,245 filed on July 23, 1976 and assigned to the same assignee as the present application, a specific system geometry was disclosed whereby, if the angles of incidence and diffraction of the principal light ray are made substantially equal, the reconstructed image wavefront propagating from the holographic spinner is substantially insensitive to spinner wobble. This geometry, however, places a constraint upon the system since it may not be possible, or desirable, in all cases, to make the angles of incidence and diffraction equal. Also, the grating used was limited to transmissive types.

It is, therefore, the one object of this invention to provide a holographic scanner which is insensitive to mechanical wobble during rotation.

Another object is to provide a holographic scanner which is invariant with respect to mechanical wobble without any constraints placed on the angles of incidence and diffraction of the principal light rays.

Still another object is to provide a holographic scanner which can be of the transmissive or reflective type and which is invariant with respect to mechanical wobble.

Other objects, advantages, and features of this invention may become apparent from the following more detailed description given in connection with the accompanying drawings.

DRAWINGS

DESCRIPTION

Figure 1:
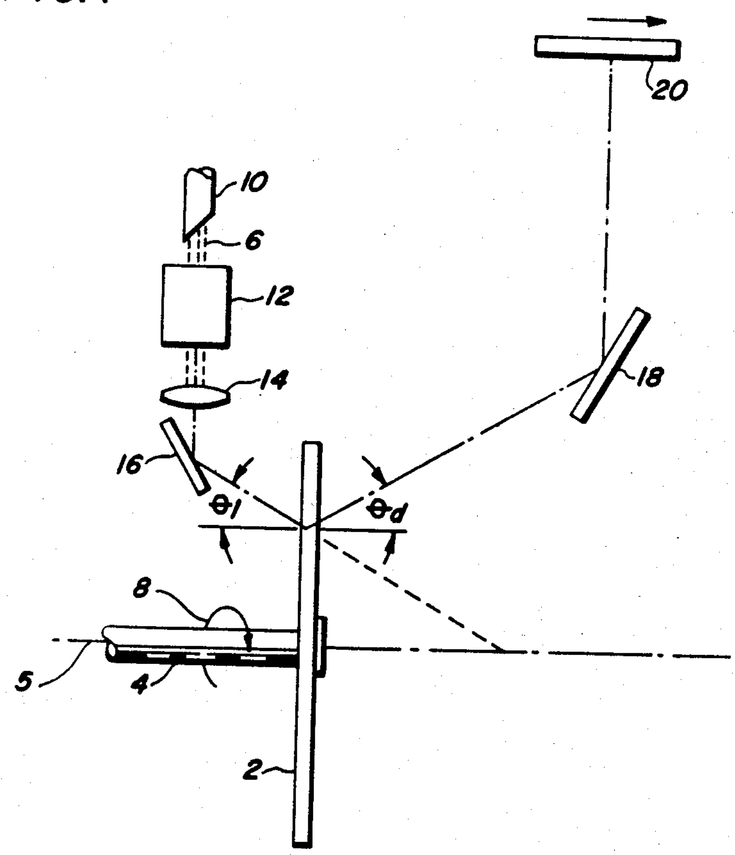
FIG. 1 is a schematic illustration of a scanning system in which a holographic spinner is used to generate a scanning spot of light.

Referring now to FIG. 1, a holographic spinner is shown at 2 mounted for rotation on a shaft 4. The holographic spinner 2 is a transmission-type hologram and is disposed in the path of a reconstruction light beam 6 which, after diffraction from the hologram, is a reconstruction of the wavefront to which the hologram was originally exposed. The hologram was originally exposed to interfering object and reference beams, the object beam emanating from a point source of light. Thus, the hologram contains information for the reconstruction of the point source and the locus of this reconstructed point source as the holographic spinner is spun on the axis 5 is a circle in space. The spinner 2 can be sectioned into a plurality of holographic facets which are analogous to the several facets of a polygon mirror scanner. It is known in the art of holography that repeated exposures can increase the density of information contained in the hologram. This is not material to the present invention but is mentioned here since it may be preferred to generate simultaneously a plurality of scanning light spots.

Holographic spinner 2 is driven by a suitable motor, (not shown) in a direction indicated by the arrow 8.

Reconstruction light beam 6 emanates from a laser or other source of coherent light 10. A modulator 12 is disposed in the path of light beam 6 to provide the desired modulation to the light beam for the purpose of "writing" with the scanning light spot. A lens 14 and reflector 16 are provided to control the light beam 6 and direct it as desired onto the holographic spinner. Light beam 6 is represented only by its principal ray, incident upon the holographic spinner at an angle $\theta_i$. The holographic spinner diffracts the light beam 6 at an angle of diffraction $\theta_d$. A reflector 18 directs the light from hologram 2 and the light spot generated by the hologram to a scan surface 20 which may be a xerographic plate or some other photosensitive surface. Surface 20 is represented as moving in a direction normal to the direction of scan by the light spot to effect raster scanning over the two-directional surface.

Figure 2:
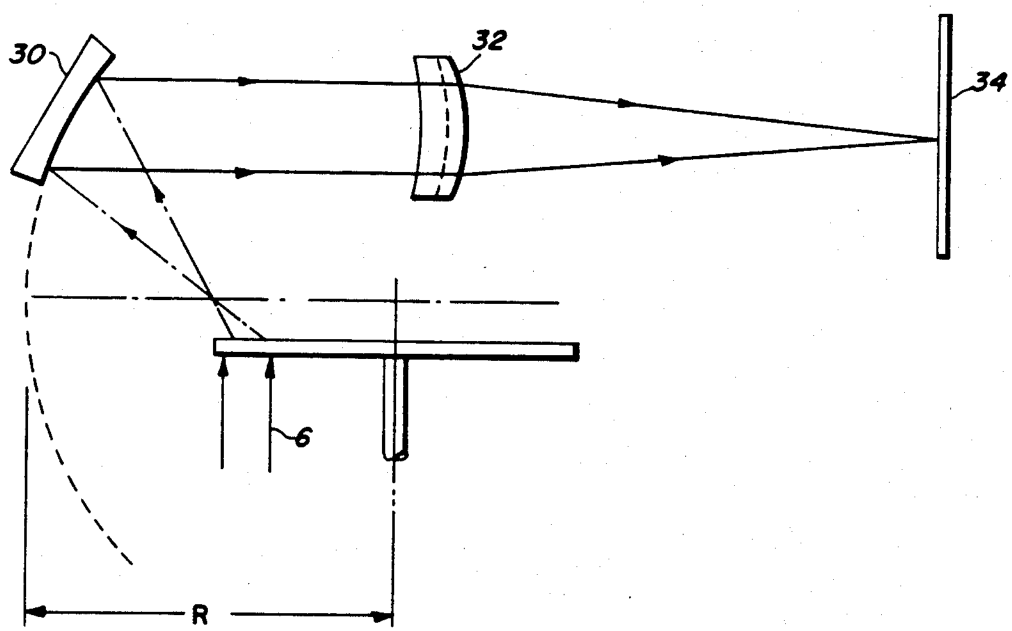
FIG. 2 is a schematic illustration of a prior art holographic scanning system employing a spherical mirror to eliminate scan line bow.

Turning now to FIG. 2, there is shown a prior art scanning system which deals with the problem of a curve or "bow" in the scan line. As discussed above, as the holographic spinner 2 rotates about its axis 5, the locus of the reconstructed point source is a circle in space. If the image plane is a flat sheet which is positioned tangentially to the scan circle, the loci of the scan incident on the sheet is, in general, a curved or bowed line. This bow is eliminated by placing a spherical curved mirror 30 in the path of the scan beam. The mirror is a section of a sphere which has its center located on the spinner axis. Due to the concentric system symmetry the diffracted beam has a ray height on the spherical mirror which is independent of spinner rotation angle and, therefore, the collimated scan beam reflected from the mirror 30 will describe a straight line on a flat surface if the beam is perpendicular to the axis of rotation. Focusing lens 32 converts the scanning collimated beam into a scanning line on image plane 34.

Figure 3:
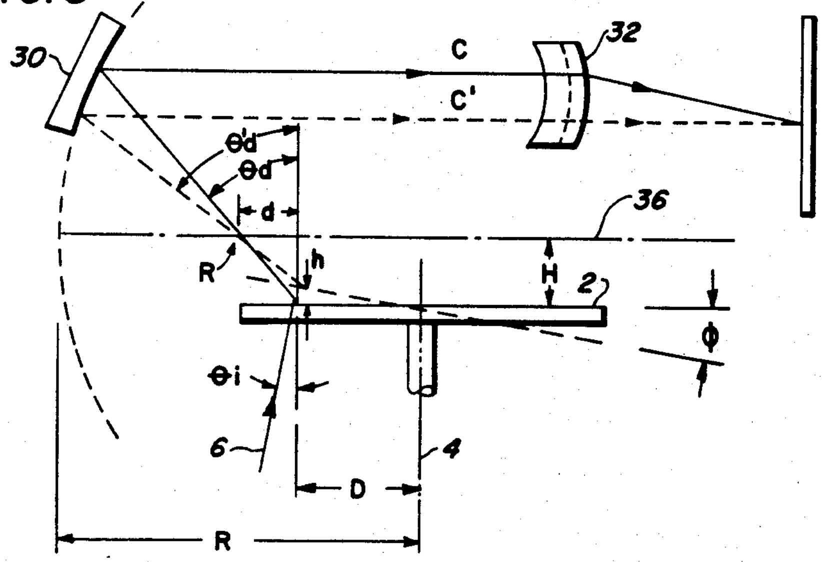
FIG. 3 illustrates the novel system geometry used in the environment of FIG. 3.

The system shown in FIG. 2 is still subject to scan distortion due to spinner wobble. FIG. 3 illustrates a system geometry according to the present invention wherein a condition of invariance with respect to spinner wobble is created.

To facilitate the discussion, with reference to FIG. 3, only the principal rays are represented in the figure. It is assumed that before spinner 2 is tilted due to wobble that the angle of the principal incident and diffracted rays is $\theta_i$ and $\theta_d$ respectively, and that the spinner is located a distance H below the mirror axis 36. The mirror axis is defined here as being the axis through the sphere (the sphere of which mirror 30 is a section) which is perpendicular to the spinner axis. When the spinner is tilted by the angle $\phi$, the surface (indicated by a long dashed line) is raised a distance h above its former position and the diffracted beam (indicated by a short dashed line) now goes off at an angle $\theta_d'$ with respect to the former surface normal. The change in the diffraction angle $d\theta_d = \theta_d' - \theta_d$ due to the tilting of the spinner is $$d\theta_d = \pm\left[1 \mp \frac{\text{Cos}(\theta_i + \phi)}{\text{Cos}(\theta_d \mp \phi)}\right] d\phi \qquad (1)$$

where the upper signs apply to transmission gratings and the lower to reflection gratings. The sign convention which is adopted here is that $\theta_i$ and $\theta_d$ are both positive when measured on the same side of the grating normal of either a transmission of reflection grating. For the case shown in FIG. 3, $d\phi$ is negative since it decreases the value of $\theta_i$. When $\theta_d > \theta_i$, a negative value of $d\phi$ results in an increase in the value of $\theta_d$ as indicated in FIG. 3.

Assuming the case where the focal point of the mirror is located on the mirror axis, there exists a set of conditions under which the diffracted ray generated by the tilted spinner (ray C') will, after reflection from mirror 30, be parallel to the ray generated by the untilted spinner (ray C). It is apparent that in order for C and C' to be parallel they must both pass through the focal point of the mirror. In order for this to occur, the change in diffraction angle due to spinner wobble, $d\theta_d$, must be equal to the change in the angle required to make C' go through the focal point. The change in angle, $d\theta$, required to make C' go through the focal point can be calculated as follows. For most cases of interest, the wobble angle, $\phi$, is of the order of a few minutes. Under these conditions, the following approximation holds:

$$d\theta = -\frac{dh}{r} = -\frac{D\,\text{Sin}\,\theta_d\,\text{Cos}\,\theta_d}{H}\,d\phi \qquad (2)$$

where D is the distance of the facet from the spinner axis. From Equations (1) and (2), we obtain the conditions under which $d\theta = d\theta_d$:

$$D = -\left[1 \mp \frac{\text{Cos}(\theta_i + \phi)}{\text{Cos}(\theta_d \mp \phi)}\right] \frac{H}{\text{Sin}\,\theta_d\,\text{Cos}\,\theta_d} \qquad (3)$$

where the upper signs apply to transmission gratings and the lower to reflection gratings. When the conditions set forth in Equation (3) are met, the scan line is invariant with regard to spinner wobble since parallel rays are brought to the same point by focusing lens 32. As a practical matter H will most often be the quantity to be solved by the Equation.

This derivation considered only the behavior of the principal rays and since the off axis rays will have slightly different values for $\theta_d$ and possibly for $\theta_i$, spinner wobble would be expected to produce some astigmatic aberration of the scan spot. When the output beam of the spherical mirror is not collimated, as implied in the above derivation, the invariant conditions stated in Equation (3) still apply, since all the rays that pass through a given object point will be mapped into a single image point if the aberrations of the optical system are small. The only change which must be incorporated into Equation (3) to accommodate the more general case where the output beam is not collimated, is that H is now the perpendicular distance of the focal point of the facet from the spinner surface. Even when the output beam is collimated the position of optimum focus of the mirror and, therefore, the facet usually does not occur on the mirror axis. Under these conditions, H is again the perpendicular distance of the optimum focal point from the spinner surface.

It should be appreciated that equation (3) rerepresents a set-up condition which governs the position of the relative parameters. The normal value of $\phi$ would be taken to be zero.

The invariant condition described above can satisfy a widerange of system geometries and applies to both transmission and reflective gratings.

What is claimed is:

1. In a holographic scanning system which includes a holographic spinner disposed in the path of a light ray from a source of coherent light; said holographic spinner having at least one holographic facet formed on its surface, a method of creating a condition whereby the spinner is insensitive to tilting caused by mechanical wobble during rotation including the steps of:

(a) directing said light ray incident upon the holographic spinner at an angle of incidence $\theta_i$, said spinner diffracting said ray at a first order diffraction angle $\theta_d$, (b) disposing a spherical mirror in the path of said diffracted ray, said mirror having an axis which is perpendicular to the spinner axis and having its center of curvature lying on said spinner axis, (c) selecting a spacing D of the holographic facet from the spinner axis and a spacing H of the mirror axis from the spinner surface so as to satisfy the following Equation:

$$D = -\left[1 \mp \frac{\cos(\theta_1 + \phi)}{\cos(\theta_d \mp \phi)}\right] \frac{H}{\sin\theta_d \cos\phi_d}$$

where $\phi$ is the nominal angle about which the spinner is tilted and where the upper signs apply to transmission type spinners and the lower to reflection type and (d) focusing the diffracted rays which are reflected in parallel paths from the mirror upon an imaging surface.

* * * * *